Feb. 23, 1965   I. G. BRENNER   3,170,197
APPARATUS FOR PRODUCING A FIBROUS GLASS PREFORM
Filed Jan. 12, 1961   3 Sheets-Sheet 1

INVENTOR.
IVAN G. BRENNER
BY
*Staelin & Overman*
ATTORNEYS

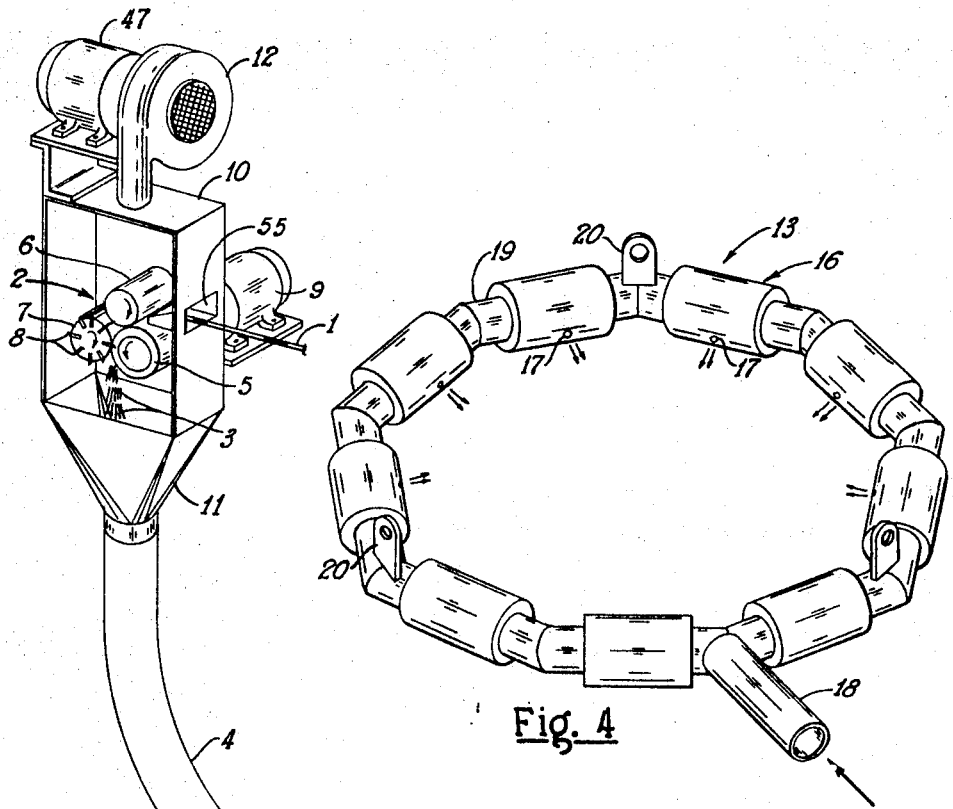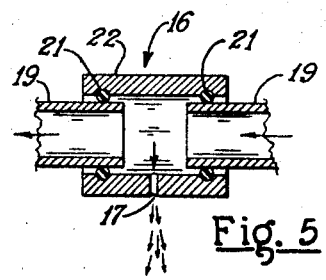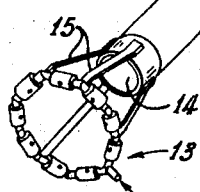

Feb. 23, 1965    I. G. BRENNER    3,170,197
APPARATUS FOR PRODUCING A FIBROUS GLASS PREFORM
Filed Jan. 12, 1961    3 Sheets-Sheet 3

INVENTOR.
IVAN G. BRENNER
BY
ATTORNEYS

United States Patent Office 3,170,197
Patented Feb. 23, 1965

3,170,197
APPARATUS FOR PRODUCING A FIBROUS
GLASS PREFORM
Ivan G. Brenner, 247 Moull St., Newark, Ohio
Filed Jan. 12, 1961, Ser. No. 82,209
2 Claims. (Cl. 19—148)

This invention relates to the production of fibrous articles and more particularly to the production of a base product of discontinuous fibers which is used to reinforce shaped resinous articles.

Recently composite materials of many types have come to the forefront. Composites having matrices of organic resins, such as polyesters, epoxys, acrylics and phenolics, which are reinforced with fibrous materials have been used and are among the most successful of these composite materials. Nylon and rayon fibers have often been used to reinforce these resins and where a low cost reinforcing material is needed, hemp and sisal have been utilized advantageously. However, one of the best known and most widely accepted materials for reinforcing organic resins and many other materials is fibrous glass. Ordinarily, the fibrous glass is in the form of fine, substantially continuous, filaments which are combined into multifilament strands and yarns or broken into short lengths. The present invention will be described herein with particular reference to the utilization of glass textile fibers as the reinforcing material although it will be recognized that other fibers, including sisal, hemp, bagasse, jute, and numerous other natural animal and vegetable fibers; as well as a multitude of synthetic fibers including nylon and rayon; and inorganic fibers such as mineral wool, rock wool, and asbestos; or any combination thereof, with or without glass fibers may also be used.

Glass textile fibers are formed by melting glass in a feeder having a bottom provided with many small orifices. The molten glass is flowed through these orifices as streams which are attenuated by a revolving mandrel located below the feeder to form continuous textile fibers. These continuous textile fibers are grouped into a strand of, for example, about 204 filaments and are in this form collected on the mandrel.

Often 40 or more of these strands are collected in parallel, side-by-side relationship to form a roving. At other times a strand is looped back and forth upon itself to form a pseudo-roving. These rovings are chopped to short lengths and are gathered as a mat which may be subsequently used as the reinforcing material in the production of trays, etc. made of resins reinforced with the fibrous glass.

When molding contoured reinforced resin articles such as hats, trays, or boat hulls, it is frequently the practice to first form a loosely integrated mass or preform of glass fibers conforming to the general shape of the final product. This is done by collecting the fibers and a small amount of resinous binder on a foraminous mold which has the same general contour as the article to be molded. The mold with the preformed mass of loosely bonded fibers thereon is removed from the forming chamber and placed in a heated oven to cure the binder and tightly bond the fibers together at their intersections. The cured preform is then removed from the mold. This preform is adaptable to being folded and stored before final processing to the finished article is effected, whereupon the preform is placed in a press, and resin in a sufficient amount is added to provide the matrix for the finished article. The press is then closed and heat is applied to cure this resinous matrix. The composite article is then removed from the mold and any excess material or flashing is removed.

The preforms are usually produced by cutting the glass strands into short lengths or short bundles of glass filaments and blowing the short lengths into an enclosed chamber where they are collected on a foraminous collecting surface or mold that is approximately the same size and shape as the article to be molded. The chopped strands are generally fed into the forming chamber as a rather compact stream that must be broken up and distributed throughout the chamber in order to form a uniform layer of cut strands on the collecting surface.

One type of distributor frequently used to break up the stream of cut strands is an inverted cone shaped member which is rotated at high speed by an electric motor. Fiber engaging fingers or arms project from the body of this cone shaped member in a manner so that they will hit or flail the falling strands, thereby distributing these strands laterally within the chamber. This type of distributor, however, has several disadvantages including a lack of maneuverability, and a weakening of the strand lengths because of the flailing action of the distributor.

For many products the fibrous preform can be more readily produced in processes which are not readily carried out in an enclosed chamber. This is especially true for large articles such as boats or bathtubs or other articles having complex shapes, as well as articles requiring selective reinforcement with larger amounts of reinforcing material. Preforms for producing these types of articles are more readily produced by blowing or spraying the strands directly onto the foraminous collecting surface. Here also, the best results are obtained when the stream of strands is dispersed before the strands are deposited on the foraminous mold. Also, the preforms for these types of articles were normally produced one at a time by depositing the cut strands onto a foraminous mold, and then removing the mold with the cut strands thereon and replacing it with another mold.

An object of this invention is to provide a more economical and more efficient continuous process for producing preforms than has been available heretofore.

Another object of this invention is to provide a continuous process for producing preforms wherein a greater number of reinforcing strands are capable of being deposited in selected areas of the preform.

A further object of this invention is to provide a process for producing fibrous preforms wherein the foraminous mold is continuously advanced adjacent a strand supply means.

A further object of this invention is to provide a process and apparatus for producing improved strand distributing resin reinforcing apparatus.

Another object of this invention is to provide an arrangement for distributing lengths of fibrous strands or bundles of filaments in the production of fibrous products without weakening the bond between adjacent filaments.

Another object of this invention is to provide improved apparatus for pneumatically distributing strand lengths in the production of fibrous products.

A further object is to provide means for supplying gases to aid the movement of the strands toward the foraminous collecting surface.

Further objects and advantages of this invention will be apparent when reference is made to the specification and drawings in which:

FIGURE 3 is a partial sectional view of chopping and distributing apparatus incorporating the principles of this invention;

FIGURE 4 is an enlarged view of the distributing unit of the apparatus shown in FIGURE 3;

FIGURE 5 is an enlarged sectional view of one of the series of air chambers shown in the distributor unit of FIGURES 1 and 2;

FIGURE 1 illustrates a process for the continuous production of a fibrous preform by depositing lengths of cut strands onto a foraminous mold as it is carried past a plurality of cut strand supply sources.

Figure 2:
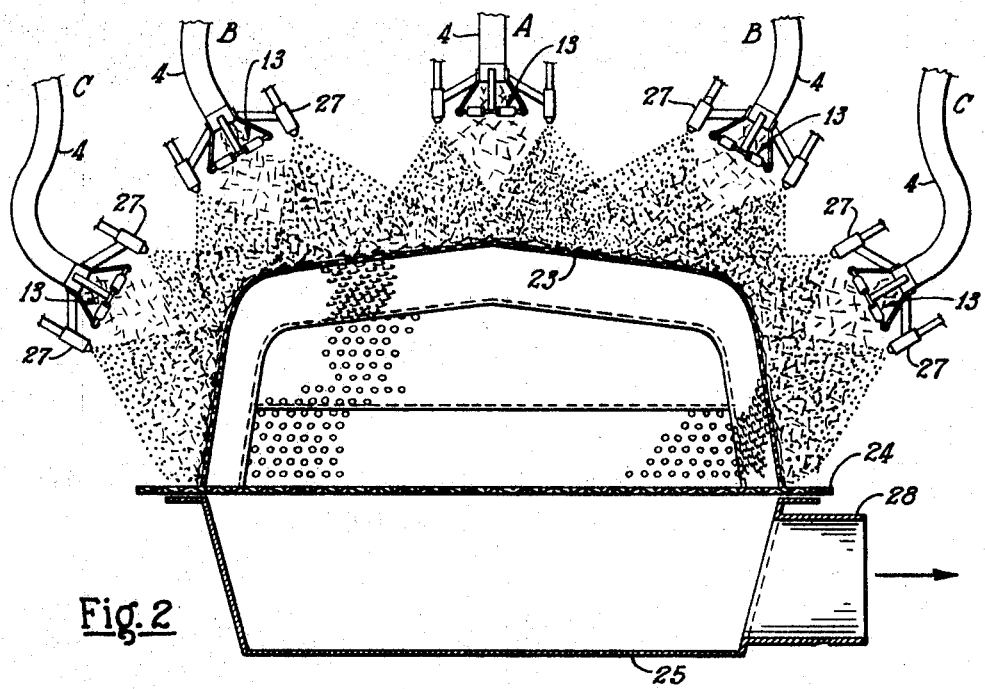
FIGURE 2 is an end elevational view of the process of FIGURE 1 as viewed from the end toward which the preform is moved.
Figure 1:
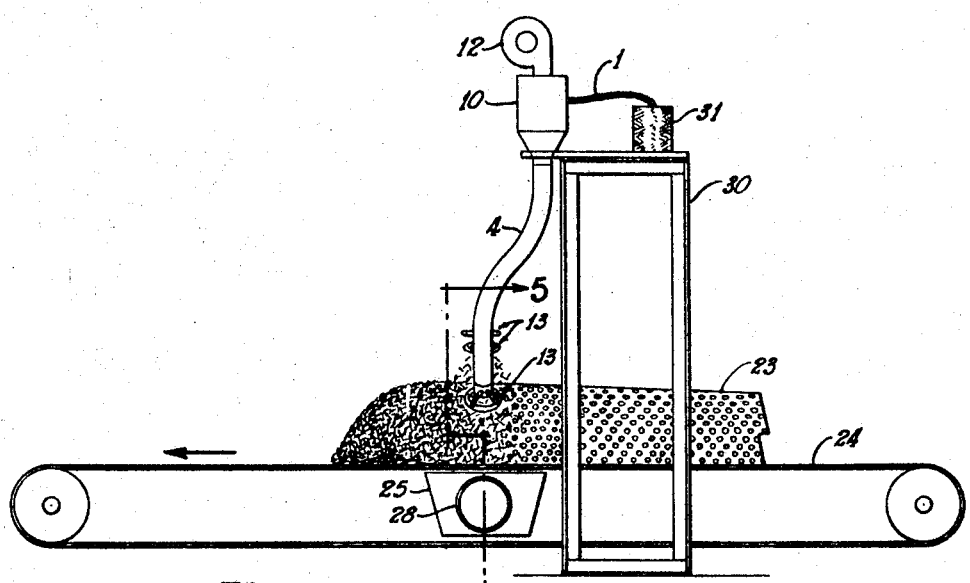
FIGURE 1 is a side elevational view of a process for the continuous production of fibrous preforms incorporating the principles of the present invention.

Apparatus for performing this operation comprises a fan 12 and a tube 4 to convey the cut strands as a stream to the forming zone where a distributor 13 breaks up the stream of cut strands and spreads them over a larger volume. A foraminous mold 23 is transported through the forming zone and a deposition of the cut strands thereon is effected by a withdrawal of gases from the forming zone through the foraminous mold 23 into a plenum chamber 25. These gases are removed from the plenum chamber through a duct 28 by a fan (not shown). If the foraminous mold is large it is often beneficial to place a number of parallel vertical dividers extending across the mold to restrict the flow of gases through the foraminous mold to that portion of the mold immediately above the plenum chamber.

To form the fibrous preform continuous filament strands 1 are fed from a strand supply source such as a package 31 supported by a frame 30 that straddles the conveyor. These continuous filament strands are severed in short lengths and these short lengths are conveyed through tubes or ducts 4 to a zone where the fibrous preforms are produced. The cut strands from the conveying ducts 4 are spread laterally by the distributors 13 and generally deposited onto the portion of the foraminous mold immediately adjacent the exit end of the conveying ducts 4. Fans 12 blow gases through the conveying ducts. These gases entrain the cut strands and carry them through the conveying ducts and expel them therefrom toward the foraminous mold.

A sectional end view of the process for producing these fibrous preforms as illustrated in FIGURE 2 more clearly demonstrates the co-operative action of the various cut strand supply units in depositing the required amounts of cut strands upon the foraminous mold to form a preform in which a greater quantity of cut strands for reinforcement is placed at the points where the greatest stresses will occur in the final reinforced resinous article. The cut strands which are expelled from the conveying ducts 4 pass through the distributors 13. Gases are supplied to these distributors under pressure and are expelled through openings in the walls of the distributors. These gases interreact with the streams of cut strands which are expelled from the conveying ducts 4 pushing the individual cut strands laterally outward thereby spreading them more evenly over the foraminous mold 23. Binder is sprayed, from binder spray guns 27, onto the cut strands during their journey from the conveying ducts 4 to the foraminous mold 23 and is also applied to them after they have been collected on the foraminous mold. This binder adheres the cut strands together at their intersecting points thereby forming a loosely integrated bonded mass.

The cut strand supply ducts are positioned and oriented so that the cut strands from each supply duct are deposited upon a predetermined area of the mold. Thus, as shown in FIGURE 2, the outer strand supply ducts (C) are positioned to supply cut strands for deposition on the sides of the foraminous mold 23 while the center cut strand supply duct (A) supplies cut strands for deposition on the center of the mold and the cut strand supply ducts (B) furnish strands for deposition between those deposited from duct (A) and those deposited from duct (C). If additional reinforcement is desired at some section of the preform, such as along the edges, additional cut strand supply ducts, distributors, and binder spray guns can be furnished to deposit cut strands thereat. Also, if necessary, a group of cut strand supply assemblies can be positioned to deposit a second layer of cut strands over the entire mold or over those sections where additional reinforcement is required.

Referring to FIGURE 3, glass strands or rovings 1 are drawn from a source such as packages stored on a creel. The strands pass through an opening 55 in the side of a chamber 10 to a severing mechanism 2 which cuts them into short lengths. The short lengths of cut strands 3 then pass through a flexible conveying duct such as metal or rubber tube 4 which releases them in the collection zone near the foraminous mold upon which the preform is produced.

One type of strand severing mechanism which may be used is a chopper such as is disclosed in U.S. Patent No. 2,719,336. In the present instance, such a chopper is embodied in an assembly incorporating a conveying roll 5, a pressure roll 6, and a cutting roll 7. The pressure roll 6 is usually made of hard rubber and is arranged to move against the conveying roll to establish sufficient contact between the strands 1 and the conveying roll 5 to withdraw the strands positively from their source. The pressure roll 6 is not located directly above the roll 5, but is positioned to contact the conveying roll 5 on the side toward the cutting roll 7 thereby starting the strands downward between the cutting roll 7 and the conveying roll 5. The co-acting cutting roll 7 has a number of hardened steel members or blades 8 circumferentially spaced and projecting from its periphery. The steel blades 8 force the glass strands against the hard rubber conveying roll 5 and cut them to the desired length. If it is desired to cut the strands into varying lengths, the steel blades may be spaced at uneven intervals around the cutting roll 9. Also, the rate at which the strands are cut and consequently the rate of deposition of the strands on the foraminous mold can be controlled by regulating the speed of the motor 9.

A transition section 11 is connected to the bottom of the chamber 10, and to the conveying duct or tube 4. Air or other gases are forced into the chamber 10 by a fan 12, driven by a motor 47. These gases entrain the cut strands as they are produced by the cutter 2 and carries them through the conveying duct 4. The distributor 13 is fastened to the end of the conveying duct 14 by steel straps 15. It is positioned so that the cut strands and entraining gases leaving the conveying duct 4 pass through it.

As illustrated in FIGURE 4, the distributor 13 comprises a plurality of independent and interconnecting chambers 16, each of which has a small orifice 17 in the wall. These chambers are connected together by tubes 19 and the entire assembly is mounted through brackets 20. Suitable fluids for dispersing the cut strands as they are expelled from the conveying duct 4 are supplied under pressure to the distributor through a nipple 18 from a supply source not shown. This fluid circulates to all of the chambers 16 and is ejected through the orifices 17.

FIGURE 5 illustrates the construction of the chamber 16. Each chamber comprises a short cylindrical piece 22 having a diameter enough different from the diameter of the connecting tube 19 to permit it to slide over the connecting tube. An O-ring seal positioned between this short cylindrical piece 22 and the connecting tube 19 frictionally engages the surface of the cylinders 22 thereby sealing the joint and preventing the loss of fluid from inside the cylinder through the joint. This frictional engagement permits the cylindrical piece to be readily rotated to position the orifice so that maximum effectiveness can be obtained from the fluids being ejected therethrough. Thus, by properly orienting the metal cylinders 22 the effect of the gases from the distributor and the resultant distribution of the cut strands can be controlled. These streams can be focused to produce a rather turbulent disruption at one point or spaced to give a less turbulent effect over a larger area by arranging the metal cylinders so that the orifices point in different directions. Also, somewhat of a vortex action is obtained by drilling the orifices angularly through the cylinder wall. Best results have been obtained when the streams of gases are ejected toward the center of the distributor and slightly downward.

The cut strands may be treated by the same gases that are used to break up the stream of cut strands. For example, if the strands have been freshly coated, warm gases are supplied to hasten the drying of the coating or cool, moist gases which will retard the drying are used depending upon the requirements of the particular process.

Figure 6:
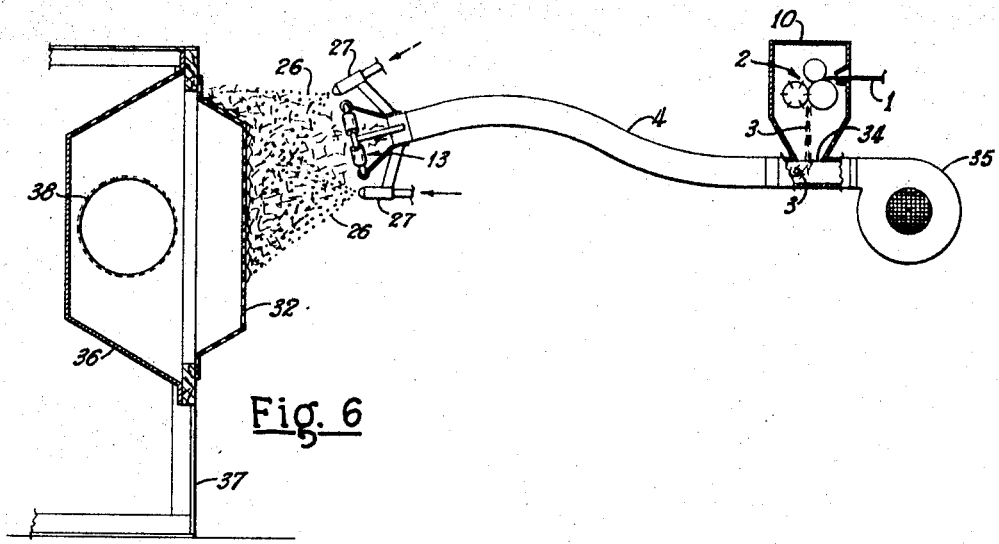
FIGURE 6 is a side elevational view, partially in cross section, of an arrangement of apparatus wherein the distributor unit of this invention is adapted to the deposition of lengths of strands on a vertical surface.

FIGURE 6, illustrates the use of the distributor of this invention for producing a preform by collecting the cut strands on a contoured but generally vertical surface. The continuous strands are pulled into the chamber 10 and are cut into short lengths by the chopper 2. They fall downward through an opening 34 in the bottom of the chamber 10 into the conveying duct 4. Gases are impelled through the conveying duct 4 by the fan 35 to entrain the cut strands 3 and carry them through the conveying duct and expel them therefrom. As the cut strands leave the conveying duct they are struck by the gases from the distributor 13 to spread them laterally. A suitable binder 26 from the binder spray guns 27 is sprayed on the dispersed cut strands. The cut strands with the binder thereon are collected on a foraminous mold 32 supported on a frame 37. This mold has the same shape as the final article to be formed. The end of the conveying duct 4 and the distributor are suitably mounted in a harness to permit the operator to manipulate them to provide a proper distribution of the cut strands over the surface of the foraminous mold. Air is drawn through the foraminous mold by maintaining a negative pressure within the plenum chamber 36 relative to the adjoining area. This movement of air through the mold into the plenum chamber aids the flow of the cut strands to the surface of the mold, and helps to hold them in place until the binder 26 has sufficiently cured to retain them in place. The movement of the cut strands to the surface of the mold is also aided by the impelling action of the gaseous jets from the distributor 13.

Figure 7:
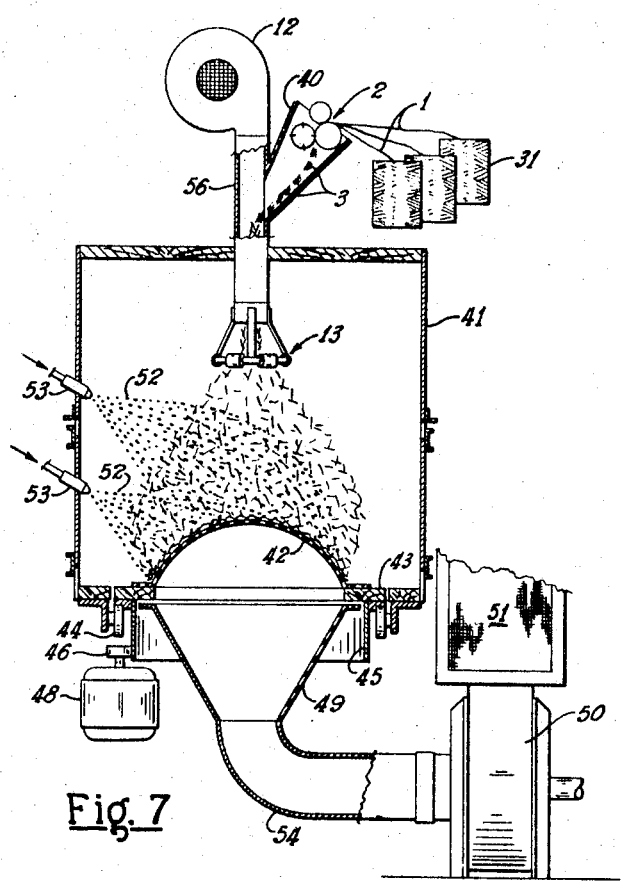
FIGURE 7 is a sectional view of apparatus for forming a preform within an enclosed chamber with a distributor utilizing the principles of this invention.

FIGURE 7, illustrates the formation of a preform within an enclosed chamber utilizing the distributor of this invention. The continuous multifilament strands 1 are drawn from the packages 31 and severed to short lengths by the chopper 2. The short lengths of cut strands 3 then travel down a chute 40 to the conveying duct 56. They fall through the conveying duct 56 into a forming chamber 41. Air may be blown through the conveying duct by a fan 12 to aid the movement of the cut strands therethrough. After emerging from the conveying duct 56 they are hit by the jets of gases from the distributor 13. These jets break up the stream of cut strands and distribute them laterally within the forming chamber.

A fan 50 withdraws air from a plenum chamber 49 through a duct 54 thereby maintaining a negative pressure within the plenum chamber relative to within the forming chamber 41. This differential in pressure causes a flow of air from within the forming chamber to the plenum chamber through a foraminous mold 42. The air carries the laterally distributed cut strands to the surface of the foraminous mold where they are filtered out. They are then held together at their intersections by binder 52 that is applied to them through binder guns 53 to form a loosely bonded integrated mass that conforms generally to the shape of the foraminous mold and to the shape of the finished reinforced article. The foraminous mold 42 is mounted on a turntable 43. This turntable is mounted on rollers 44 to facilitate easy rotation. An annular flange 45 extends downward from the lower surface of the turntable to engage a drive wheel 46 powered by a motor 48. The drive wheel 46 rotates against the annular flange 45 thereby rotating the turntable to assure a more even distribution of cut strands and binder over the surface of the foraminous mold 42. A screen 51 is mounted over the exhaust duct of the fan 50 to catch any loose fibers that are drawn through the mold to prevent their being exhausted into the surrounding room.

This distributor is also used to produce a mat of the cut strands. This is done by utilizing a chamber as shown in FIGURE 7 wherein the mold 42 is replaced with a foraminous belt. The cut strands are collected as a mat on this foraminous belt which carries them from the forming chamber to a curing oven.

It is understood that numerous changes may be made in the equipment described herein without departing from the spirit of the invention, especially as defined by the following claims.

I claim:
1. Apparatus for producing a fibrous glass preform comprising:
   (a) a flexible, freely movable, conduit;
   (b) means for cutting fibrous glass strands into short lengths and supplying said short lengths to said conduit,
   (c) means for supplying gases under pressure to said conduit to convey said short lengths of fibrous glass strands therethrough,
   (d) a distributor ring having individually rotatable sections encircling the exit end of said conduit and being spaced apart therefrom,
   (e) means for supplying gases under pressure to said distributor ring,
   (f) orifices located in said rotatable sections of said distributor ring through which the gases supplied to said distributor ring are projected to impinge upon the short lengths of fibrous glass strands passing from said conduit and disperse them,
   (g) means for supplying a suitable binding material to said dispersed short lengths of strands, and
   (h) a foraminous collecting surface for collecting said dispersed short lengths of fibrous glass strands.

2. Apparatus for producing a fibrous glass preform comprising:
   (a) a flexible, freely movable, conduit;
   (b) means for cutting fibrous glass strands into short lengths and supplying said short lengths to said conduit,
   (c) means for supplying gases under pressure to said conduit to convey said short lengths of fibrous glass strands therethrough,
   (d) a distributor ring having individually rotatable sections encircling the exit end of said conduit and being spaced apart therefrom,
   (e) means for supplying gases under pressure to said rotatable sections,
   (f) orifices located in said rotatable sections of said distributor ring through which the gases supplied to said rotatable sections are projected to impinge upon the short lengths of fibrous glass strands passing from said conduit and disperse them,
   (g) means for supplying a suitable binding material to said dispersed short lengths of strands, and
   (h) a collecting surface for collecting said dispersed short lengths of fibrous glass strands.

References Cited in the file of this patent
UNITED STATES PATENTS

| | | |
|---|---|---|
| 1,599,371 | Payzant | Sept. 7, 1926 |
| 1,915,063 | MacKinnon | June 20, 1933 |
| 1,942,905 | Semkow | Jan. 9, 1934 |
| 2,126,889 | Jenkins | Aug. 16, 1938 |

(Other references on following page)

UNITED STATES PATENTS

| | | |
|---|---|---|
| 2,317,895 | Drill | Apr. 27, 1943 |
| 2,577,205 | Meyer et al. | Dec. 4, 1951 |
| 2,587,814 | Borkland | Mar. 4, 1952 |
| 2,644,717 | Kopperschmidt | July 7, 1953 |
| 2,702,261 | Bacon et al. | Feb. 15, 1955 |
| 2,714,749 | Clark et al. | Aug. 9, 1955 |
| 2,725,601 | Brenner | Dec. 6, 1955 |
| 2,737,419 | Marcuse | Mar. 6, 1956 |
| 2,749,576 | Clark et al. | June 12, 1956 |
| 2,827,668 | Clark | Mar. 25, 1958 |
| 2,870,054 | Amos et al. | Jan. 20, 1959 |
| 2,980,786 | Chilton | Apr. 18, 1961 |
| 3,001,242 | Heffelfinger | Sept. 26, 1961 |
| 3,015,127 | Stalogo | Jan. 2, 1962 |
| 3,020,585 | Berthon et al. | Feb. 13, 1962 |

FOREIGN PATENTS

| | | |
|---|---|---|
| 1,175,022 | France | Nov. 10, 1958 |